US010550859B2

(12) United States Patent
Suzuki

(10) Patent No.: US 10,550,859 B2
(45) Date of Patent: Feb. 4, 2020

(54) NEGATIVE-PRESSURE TYPE BOOSTER DEVICE

(71) Applicant: ADVICS CO., LTD., Kariya-shi, Aichi-ken (JP)

(72) Inventor: Kimiyasu Suzuki, Gamagori (JP)

(73) Assignee: ADVICS CO., LTD., Kariya-Shi, Aichi-Ken (JP)

( * ) Notice: Subject to any disclaimer, the term of this patent is extended or adjusted under 35 U.S.C. 154(b) by 11 days.

(21) Appl. No.: 16/073,049

(22) PCT Filed: Jan. 27, 2017

(86) PCT No.: PCT/JP2017/003039
§ 371 (c)(1),
(2) Date: Jul. 26, 2018

(87) PCT Pub. No.: WO2017/131192
PCT Pub. Date: Aug. 3, 2017

(65) Prior Publication Data
US 2019/0063467 A1 Feb. 28, 2019

(30) Foreign Application Priority Data
Jan. 29, 2016 (JP) ................................. 2016-015658

(51) Int. Cl.
*F15B 11/10* (2006.01)
*B60T 13/57* (2006.01)
(52) U.S. Cl.
CPC .............. *F15B 11/10* (2013.01); *B60T 13/57* (2013.01); *F15B 2211/405* (2013.01)

(58) Field of Classification Search
CPC ................................. F15B 11/10; B60T 13/57
See application file for complete search history.

(56) References Cited

U.S. PATENT DOCUMENTS 9,555,787 B2 * 1/2017 Grace ..................... B60T 13/57
2004/0255771 A1 * 12/2004 Tsubouchi ............. B60T 13/52
91/376 R
(Continued)

FOREIGN PATENT DOCUMENTS

JP 200923506 A 2/2009

OTHER PUBLICATIONS

International Search Report (PCT/ISA/210) dated Apr. 25, 2017, by the Japanese Patent Office as the International Searching Authority for International Application No. PCT/JP2017/003039.

*Primary Examiner* — Thomas E Lazo
(74) *Attorney, Agent, or Firm* — Buchanan Ingersoll & Rooney PC

(57) ABSTRACT

In this negative-pressure booster, one of a negative-pressure valve seat and a negative-pressure valve section has, provided thereto, one or more first protruding sections abutting against the other of the negative-pressure valve seat and negative-pressure valve section, at a site other than a first annular abutment site, in an initial state where an operational force has not been applied to an input member; and/or one of an atmospheric valve seat and an atmospheric valve section has, provided thereto, one or more second protruding sections abutting against the other of the atmospheric valve seat and atmospheric valve section, at a site other than a second annular abutment site, in the initial state where an operational force has not been applied to the input member.

7 Claims, 7 Drawing Sheets

(56) References Cited

U.S. PATENT DOCUMENTS

2009/0008200 A1\* 1/2009 Tsubouchi .............. B60T 13/57
  188/356
2013/0098236 A1\* 4/2013 Hattori .................... B60T 13/57
  91/376 R \* cited by examiner

[Fig.1]
(AXIAL DIRECTION) FRONT ⟷ REAR
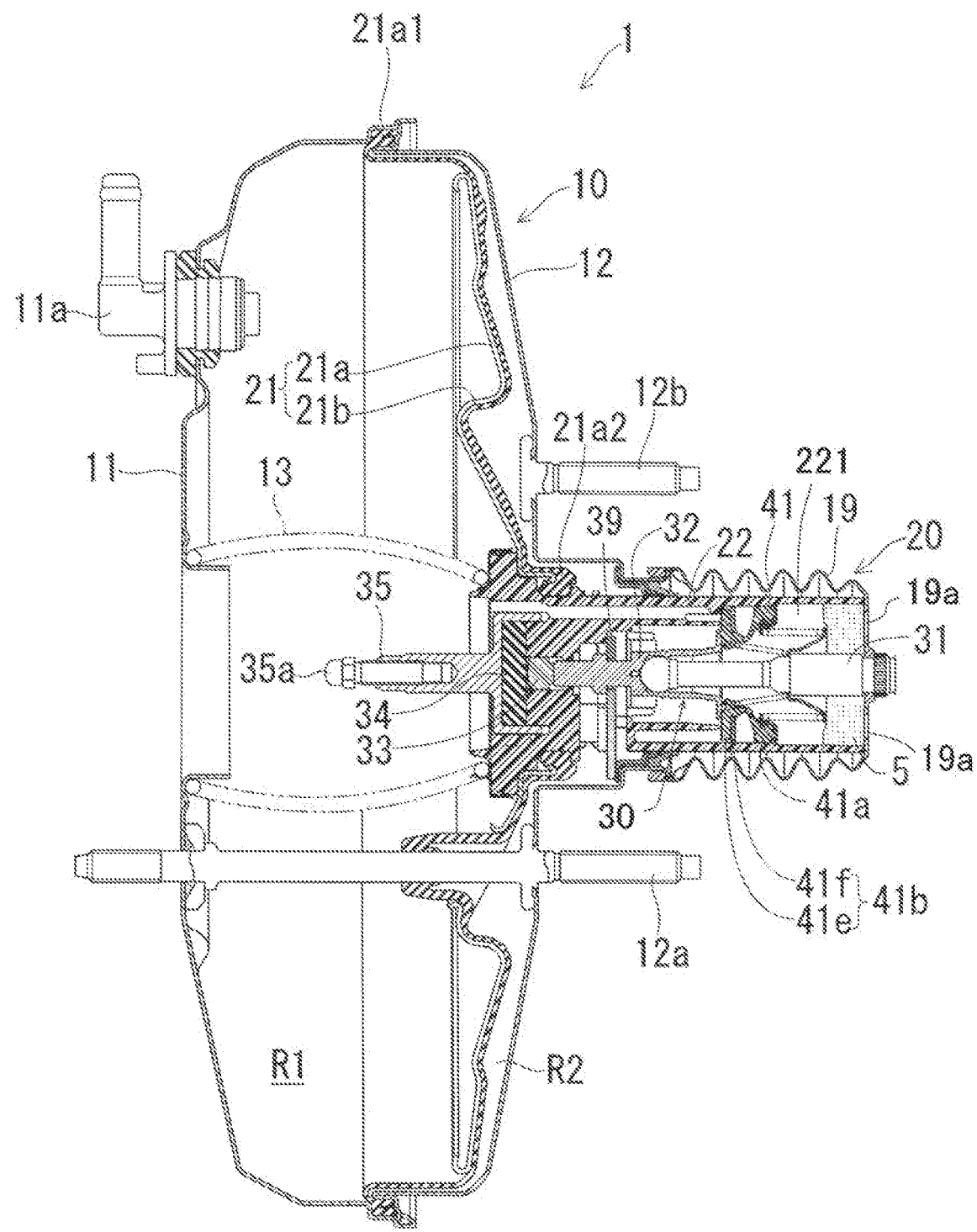

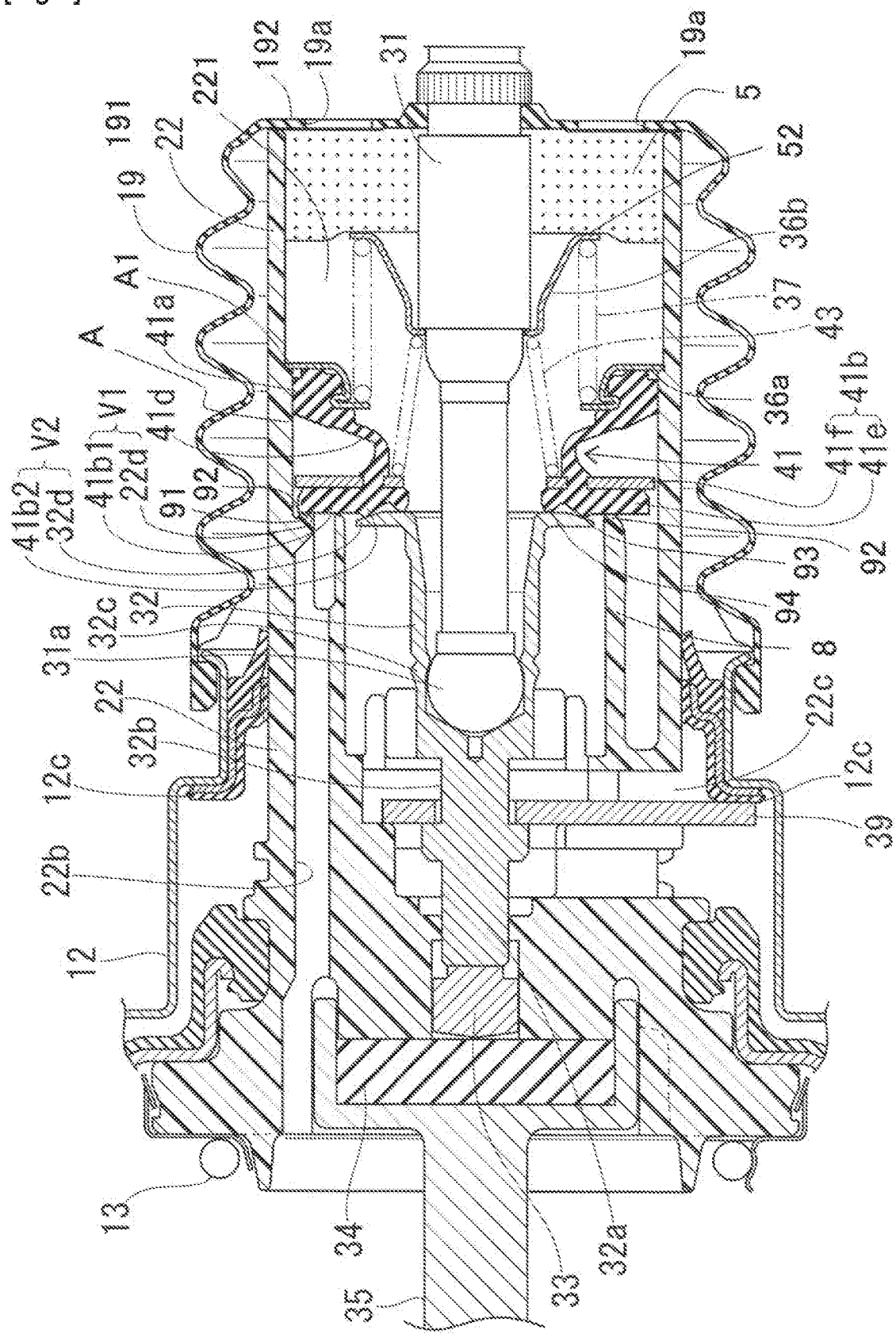
[Fig.2]

[Fig.3]
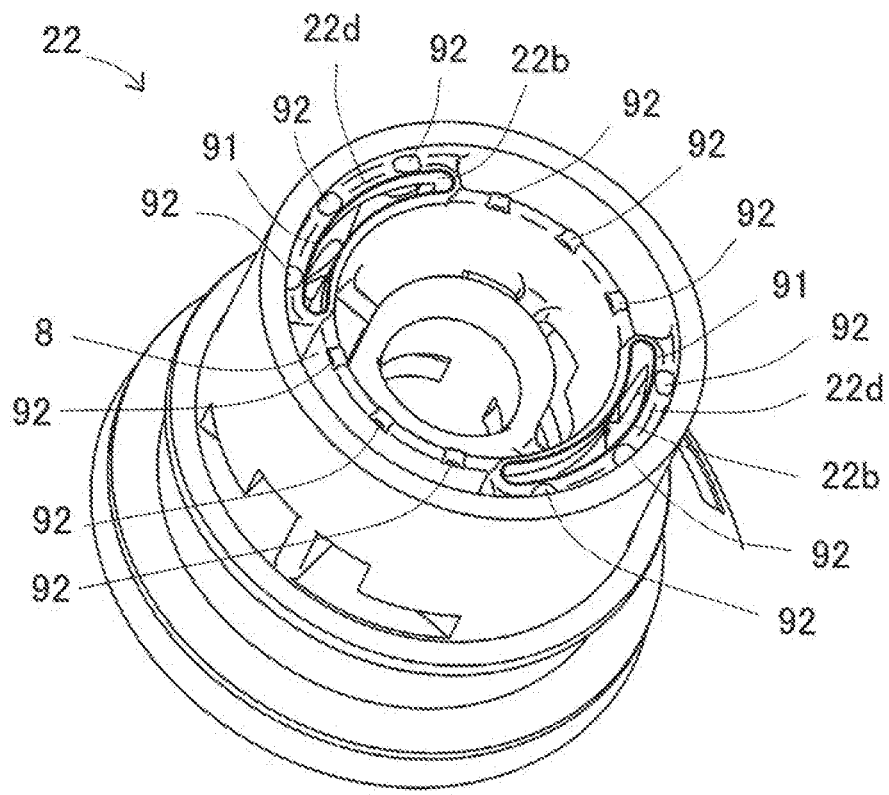
[Fig.4]
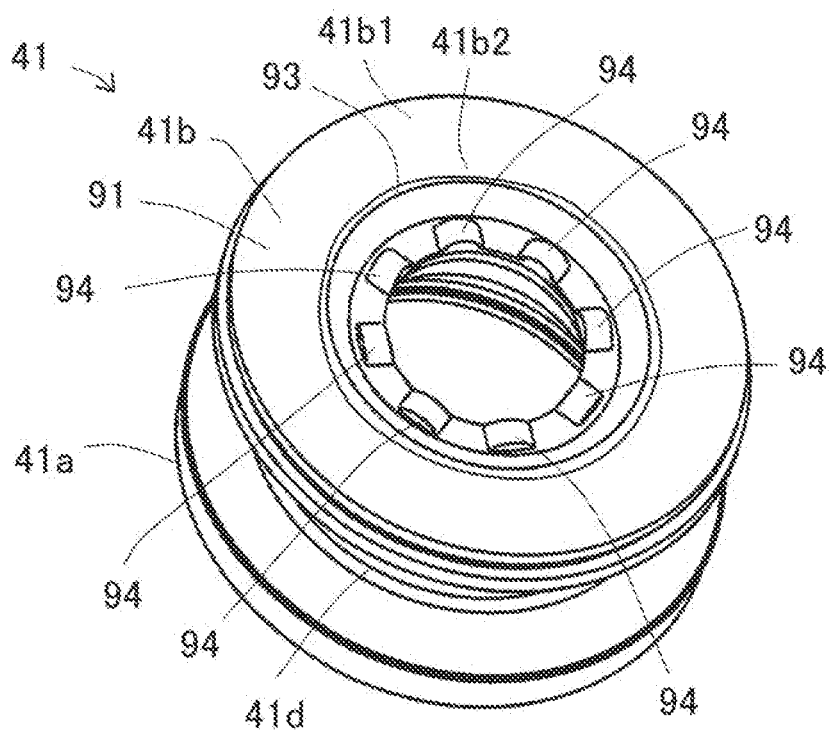

[Fig.5]
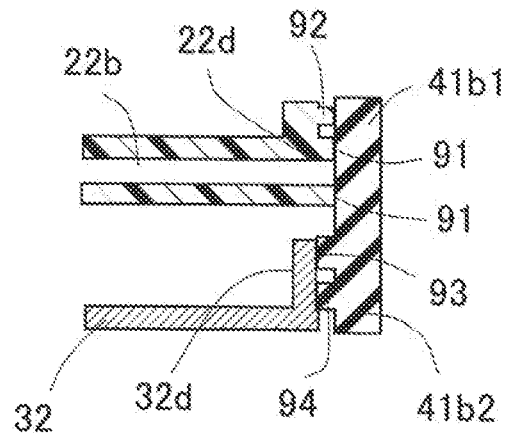
FRONT ⟵⟶ REAR
[Fig.6A]
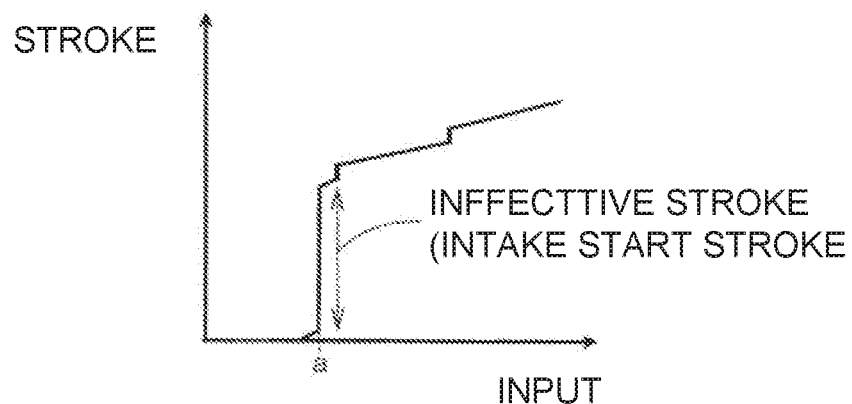
[Fig.6B]
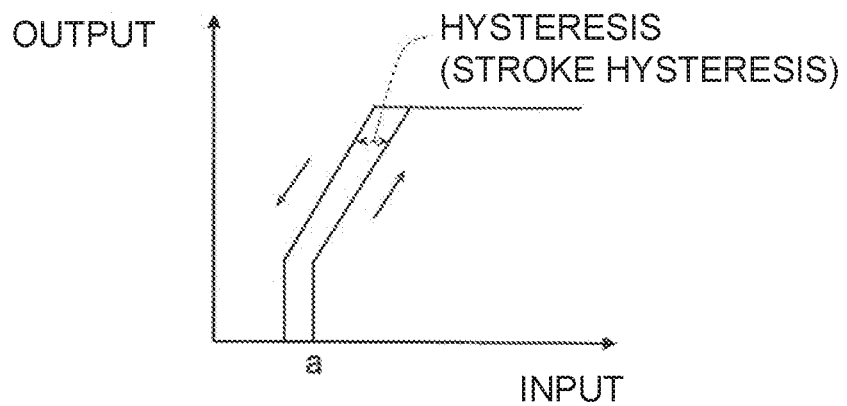

[Fig.7]
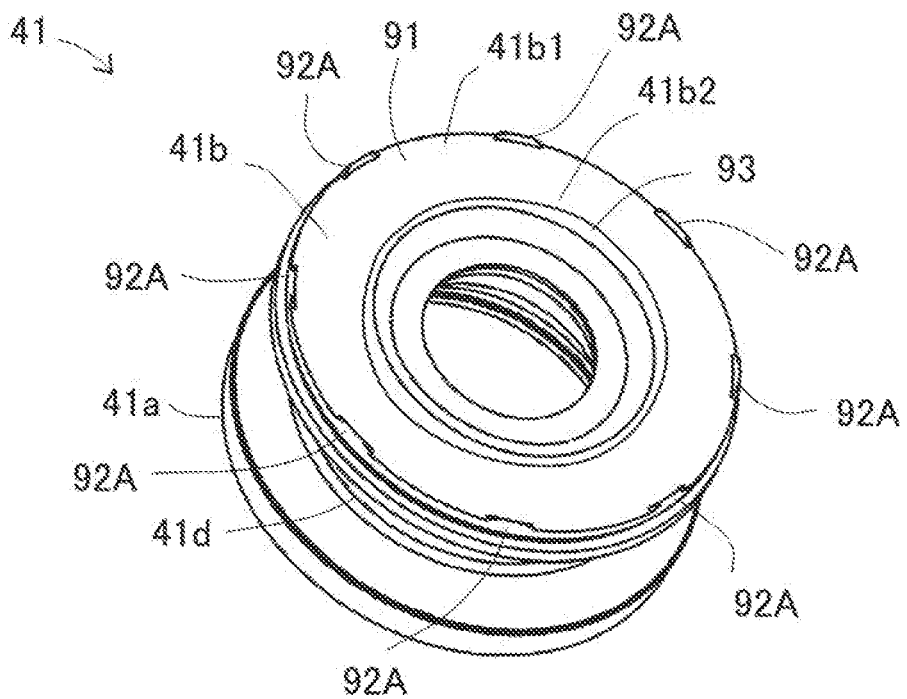
[Fig.8]
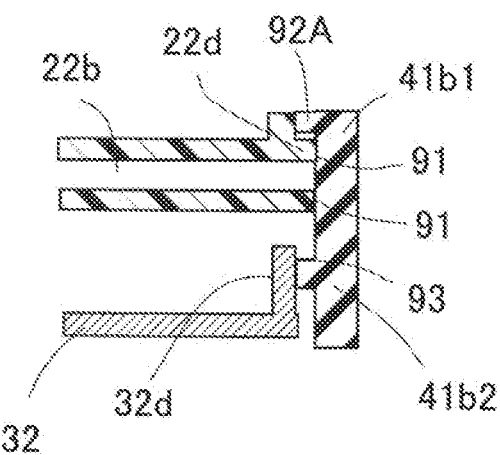
FRONT ← → REAR

[Fig.9]
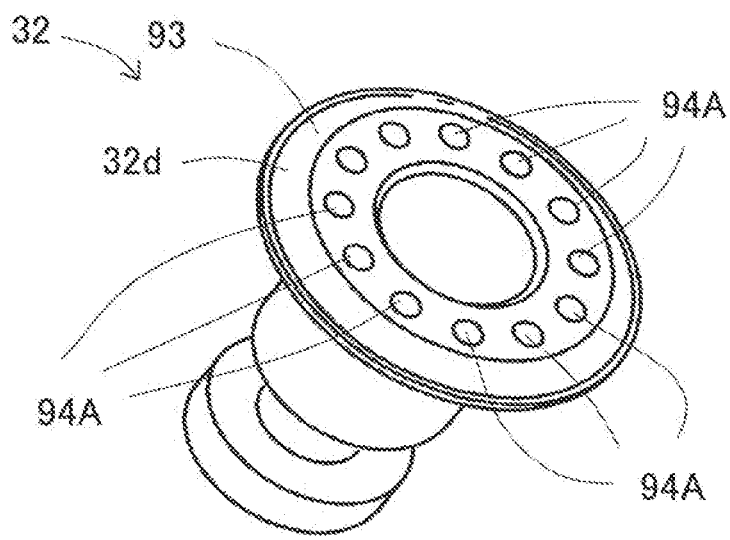
[Fig.10]
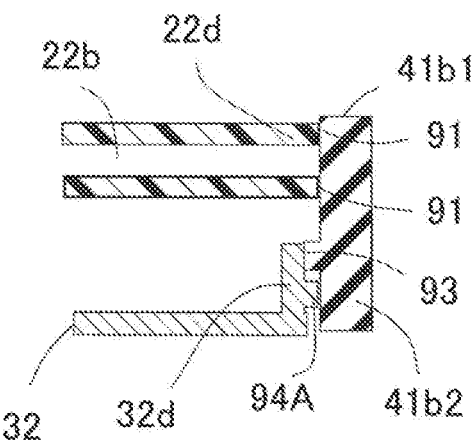
FRONT ←----→ REAR

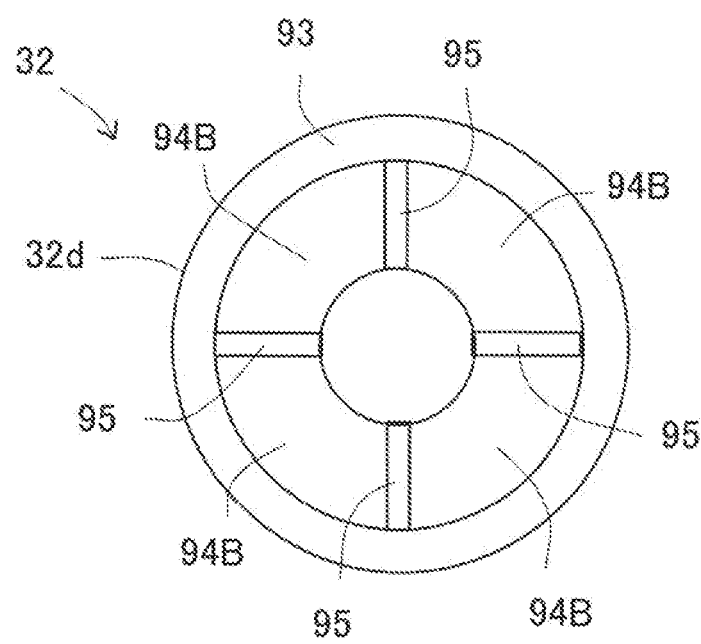
[Fig.11]

NEGATIVE-PRESSURE TYPE BOOSTER DEVICE

TECHNICAL FIELD

The present invention relates to a negative-pressure type booster device.

BACKGROUND ART

A negative-pressure type booster device is provided with, for example, a housing formed of a front shell and a rear shell, a movable partition wall which partitions the interior of the housing into a negative-pressure chamber on a front side and a variable pressure chamber on a rear side, and a main body which opens or closes the variable pressure chamber to atmospheric air. When the variable pressure chamber is opened to the atmospheric air, the movable partition wall is pressed toward the negative-pressure chamber side by a differential pressure between the variable pressure chamber and the negative-pressure chamber, and moves forward. When the variable pressure chamber and the negative-pressure chamber communicate with each other, the differential pressure between the variable pressure chamber and the negative-pressure chamber decreases, and pressing force to a forward movement side of the movable partition wall decreases. Therefore, the negative-pressure type booster device is provided with a negative-pressure valve which allows the communication between the variable pressure chamber and the negative-pressure chamber and blocks the communication, and an atmospheric valve which allows the communication between the variable pressure chamber and the atmospheric air and blocks the communication. The negative-pressure valve and the atmospheric valve have a valve part and a valve seat, and are opened and closed by contact and separation of both of them. Such a negative-pressure type booster device is disclosed in, for example, Japanese Unexamined Patent Publication No. 2009-23506.

CITATIONS LIST

Patent Literature

Patent Literature 1: Japanese Unexamined Patent Publication No. 2009-23506

SUMMARY OF INVENTION

Technical Problems

In the negative-pressure type booster device as described above, when the valve part and the valve seat come into contact with each other so as to be in a closed state (blocked state), the valve part and the valve seat come into contact with each other only by contact parts exerting a sealing function. That is, the valve part and the valve seat of the negative-pressure valve come into contact with each other only by annular contact parts for blocking a flow path, and the valve part and the valve seat of the atmospheric valve come into contact with each other only by annular contact parts for blocking a flow path. With such a configuration, in a state in which the flow path is blocked, especially in an initial state in which there is no input, a load for blocking is concentrated on the contact part. As a result, a deformation amount of the contact part (for example, the part which is an elastic member) increases, and an ineffective stroke (intake start stroke) and hysteresis (stroke hysteresis) for operation of an input member increase.

The present invention is achieved in view of such circumstances, and an object thereof is to provide the negative-pressure type booster device which may easily reduce the ineffective stroke and the hysteresis.

Solutions to Problems

A negative-pressure type booster device provided with a housing including one shell arranged on one side and the other shell arranged on the other side, a movable partition wall which partitions the interior of the housing into a negative-pressure chamber on one side and a variable pressure chamber on the other side, a valve body assembled to the housing so as to be movable forward and rearward and connected to the movable partition wall in the housing, an input member arranged so as to be movable forward and rearward with respect to the valve body and moves in accordance with an operating force from outside, a negative-pressure valve which allows communication between the negative-pressure chamber and the variable pressure chamber and blocks the communication according to relative positions of the valve body and the input member, and an atmospheric valve which allows communication between the variable pressure chamber and atmospheric air and blocks the communication according to the relative positions of the valve body and the input member, the negative-pressure valve including a negative-pressure valve seat provided on the valve body and a negative-pressure valve part relatively biased toward the negative-pressure valve seat, the negative-pressure valve seat and the negative-pressure valve part provided with first annular contact parts which come into contact with each other to block the communication between the negative-pressure chamber and the variable pressure chamber, the atmospheric valve including an atmospheric valve seat provided on the input member and an atmospheric valve part relatively biased toward the atmospheric valve seat, and the atmospheric valve seat and the atmospheric valve part provided with second annular contact parts which come into contact with each other to block the communication between the variable pressure chamber and the atmospheric air, in which, on one of the negative-pressure valve seat and the negative-pressure valve part, one or a plurality of first protruding parts which come into contact with the other of the negative-pressure valve seat and the negative-pressure valve part in the part other than the first annular contact part are provided in an initial state in which no operating force is applied to the input member, and/or, on one of the atmospheric valve seat and the atmospheric valve part, one or a plurality of second protruding parts which come into contact with the other of the atmospheric valve seat and the atmospheric valve part in a part other than the second annular contact part in the initial state in which no operating force is applied to the input member are provided.

Advantageous Effects of Invention

According to the present invention, a deformation amount of the negative-pressure valve part is limited by the first protruding part, and a deformation amount of the atmospheric valve part is limited by the second protruding part. As a result, when the negative-pressure valve (or the atmospheric valve) changes from a closed state to an opened state, a valve opening delay caused by the deformation of the negative-pressure valve part (or the atmospheric valve part), that is, an ineffective stroke may be reduced. Adjustment of the ineffective stroke may be easily made by adjusting a protruding length of the first protruding part and/or the second protruding part without changing characteristics of the contact part (for example, hardness of an elastic member). Furthermore, by reducing the ineffective stroke, hysteresis may be reduced.

BRIEF DESCRIPTION OF DRAWINGS

FIG. 1 is a cross-sectional view illustrating a configuration of a negative-pressure type booster device according to a first embodiment.

FIG. 2 is a cross-sectional view illustrating a configuration in a valve body of the first embodiment.

FIG. 3 is a perspective view illustrating a configuration in the valve body of the first embodiment.

FIG. 4 is a perspective view illustrating a configuration of a valve element of the first embodiment.

FIG. 5 is a schematic cross-sectional view for illustrating a valve configuration of the first embodiment.

FIG. 6A is an illustrative view for illustrating an ineffective stroke.

FIG. 6B is an illustrative view for illustrating hysteresis.

FIG. 7 is a perspective view illustrating a configuration of a valve element of a second embodiment.

FIG. 8 is a schematic cross-sectional view for illustrating a valve configuration of the second embodiment.

FIG. 9 is a perspective view illustrating a configuration of a plunger of a third embodiment.

FIG. 10 is a schematic cross-sectional view for illustrating a valve configuration of the third embodiment.

FIG. 11 is a schematic diagram illustrating a configuration of a plunger of another embodiment as viewed from a rear side.

DESCRIPTION OF EMBODIMENTS

An embodiment of the present invention is hereinafter described with reference to the drawings. Meanwhile, in the following embodiments, the same or equivalent parts are assigned with the same reference sign in the drawings. Each of the drawings used for illustrating is a conceptual diagram, and a shape of each unit is not necessarily strict in some cases. Also, in the description, "one side" of a negative-pressure type booster device is referred to as a "front side" and the "other side" thereof is referred to as "a rear side".
<First Embodiment>

As illustrated in FIGS. 1 and 2, a negative-pressure type booster device 1 is mainly provided with a housing 10, a movable partition wall 21, a valve body 22, an input member 30, a negative-pressure valve V1, and an atmospheric valve V2. The movable partition wall 21 and the valve body 22 form a power piston 20.

The housing 10 is a hollow member made of metal. The power piston 20 is assembled to the housing 10 so as to be movable in a front-rear direction. The interior of the housing 10 is partitioned by the movable partition wall 21 into a front negative-pressure chamber R1 and a rear variable pressure chamber R2. The housing 10 is provided with a front shell (corresponding to "one shell") 11 arranged in front and a rear shell (corresponding to "the other shell") 12 assembled to a rear end of the front shell 11.

The front shell 11 is provided with a negative-pressure introduction pipe 11a for allowing the negative-pressure chamber R1 to constantly communicate with a negative-pressure source (for example, an intake manifold of an engine not illustrated). In addition, a rear end of a master cylinder 9 is airtightly assembled to the front shell 11. A piston (not illustrated) of the master cylinder 9 is arranged in the negative-pressure chamber R1 and configured to be pushed forward by a tip end 35a of an output shaft 35 to be described later. Meanwhile, the housing 10 is provided with an attaching bolt 12a which airtightly penetrates the front shell 11 and the rear shell 12, and an attaching bolt 12b which airtightly penetrates the rear shell 12. The attaching bolts 12a and 12b fix the housing 10 to a vehicle body. The attaching bolt 12a supports the master cylinder 9 on a front side.

The movable partition wall 21 is formed of an annular plate 21a and an annular diaphragm 21b. The movable partition wall 21 is installed so as to be movable in a front-rear direction (axial direction of the power piston 20) in the housing 10. The diaphragm 21b is airtightly pinched by the housing 10 by an annular outer peripheral bead part 21a1 formed on an outer peripheral edge thereof. Also, the diaphragm 21b is airtightly fixed to an outer peripheral part of the valve body 22 together with an inner peripheral part of the plate 21a by an annular inner peripheral bead part 21a2 formed on an inner peripheral edge thereof.

The valve body 22 is a hollow body made of resin connected to an inner peripheral part of the movable partition wall 21. The valve body 22 is formed into a cylindrical shape a front-rear direction of which is an axial direction as a whole. The valve body 22 is assembled to the rear shell 12 of the housing 10 airtightly so as to be movable in the front-rear direction. The valve body 22 is biased rearward by a return spring 13 interposed between the valve body 22 and the front shell 11.

On an inner peripheral surface of the valve body 22, a stepped part A in a rear part of which a step A1 is formed is provided. The stepped part A being a cylindrical part is formed in a central part in an axial direction of the valve body 22. An inner diameter of the stepped part A is smaller than an inner diameter of a rear end of the valve body 22. An inner peripheral surface of a rear part of the valve body 22 forms (partitions) an atmospheric introduction path 221 which connects a ventilation hole 19a to be described later and the atmospheric valve V2. The atmospheric introduction path 221 is a flow path which allows the atmospheric air (outside air) to communicate with the atmospheric valve V2 via the ventilation hole 19a.

Also, a pair of negative-pressure communication paths 22b (only one of them is illustrated in the drawing) is formed in the valve body 22. In other words, a cylindrical negative-pressure communication path 22b being a flow path extending in a front-rear direction is provided in the valve body 22. The negative-pressure communication path 22b is a flow path a rear end of which opens to the atmospheric introduction path 221 and a front end of which opens to the negative-pressure chamber R1. A filter 5 is arranged on a rear end of the atmospheric introduction path 221. Also, a key attaching hole 22c through which a key member 39 to be described later may be inserted from an outer peripheral side is formed in the valve body 22.

A boot 19 is a covering member made of rubber including a bellows-like front part 191 and a rear part 192. The boot 19 covers a protruding part of the valve body 22 outside the housing 10. A front end of the front part 191 is locked to a rear end of the rear shell 12. The rear part 192 is formed integrally with a rear end of the front part 191 and is arranged on the rear end of the valve body 22 so as to block a rear end opening of the valve body 22. On the rear part 192, a plurality of ventilation holes 19a are provided. The ventilation hole 19a is a hole for allowing the atmospheric air to communicate with the atmospheric air introduction path 221.

The input member 30 is a shaft-shaped member which moves forward and rearward in response to a brake operation. Specifically, the input member 30 is provided with an input shaft 31 and a plunger (air valve) 32. The input shaft 31 and the plunger 32 are coaxially assembled inside the valve body 22. Also, on a front part of the plunger 32 in the valve body 22, a connecting member 33, a reaction member 34, and the output shaft (output member) 35 are coaxially assembled to the valve body 22.

The input shaft 31 may move forward and rearward with respect to the valve body 22 and is articulated to a receiving connecting part 32c of the plunger 32 at a spherical tip end 31a. The input shaft 31 is swingable with respect to the plunger 32. It may be said that the input shaft 31 is an input member for inputting a pedal force to the master cylinder. Also, the input shaft 31 is biased rearward by the return spring 37. A front end of the return spring 37 is locked to the step A1 via a cylindrical member (retainer) 36a, and a rear end thereof is locked to the input shaft 31 via a cylindrical member (retainer) 36b. The cylindrical member 36b is locked to the input shaft 31. Also, the plunger 32 connected to the input shaft 31 is also biased rearward by the return spring 37.

The plunger 32 is an air valve made of metal. The plunger 32 is arranged such that a front end 32a thereof may come into contact with a central part of a rear surface of the reaction member 34 via the connecting member 33. The front end 32a is a part which partially receives reaction force from the reaction member 34 against an output via the connecting member 33. An annular groove 32b is formed in an intermediate part of the plunger 32. The annular groove 32b is formed so as to be able to lock to the key member 39. As is described later, an annular atmospheric valve seat 32d being a component of the atmospheric valve V2 is formed on a rear end of the plunger 32. In other words, the plunger 32 includes the annular (flange-shaped) atmospheric valve seat 32d radially protruding at the rear end thereof.

The output shaft 35 together with the reaction member 34 is assembled to a front end of the inner peripheral surface of the valve body 22 so as to be movable in the front-rear direction. The tip end 35a of the output shaft 35 is in contact with an engaging part (concave part) of the piston of the master cylinder 9 so as to be able to push. The output shaft 35 transmits the reaction force received from the piston of the master cylinder 9 to the reaction member 34 at the time of braking operation.

The key member 39 may come into contact with and separate from the valve body 22, the plunger 32, and the housing 10 (contact part 12c), and defines a movement amount in the axial direction of the plunger 32 with respect to the valve body 22. The key member 39 has a function of defining the movement in the front-rear direction of the plunger 32 with respect to the valve body 22 and a function of defining a rearward movement limit position (initial position of the valve body 22) of the power piston 20 with respect to the housing 10. The key member 39 is assembled to the valve body 22 and the plunger 32 so as to be relatively movable in the axial direction by a required amount.

(Negative-Pressure Valve)

The negative-pressure valve V1 is a valve mechanism which allows the communication between the negative-pressure chamber R1 and the variable pressure chamber R2 and blocks the communication in accordance with forward and rearward movement of the plunger 32 with respect to the valve body 22. In other words, the negative-pressure valve V1 allows the communication between the negative-pressure chamber R1 and the variable pressure chamber R2 and blocks the communication according to relative positions of the valve body 22 and the input member 30. The negative-pressure valve V1 is formed of a negative-pressure valve part 41b1 and a negative-pressure valve seat 22d. The negative-pressure valve part 41b1 is a part of a valve element 41 arranged in the valve body 22.

The valve element 41 is a cylindrical member as a whole arranged on the inner peripheral surface of the valve body 22 (herein, the atmospheric communication path 221). The valve element 41 is formed of an elastic part (for example, a part made of rubber) and a metal part. The valve element 41 is provided with a fixed part 41a assembled to the inner peripheral surface of the valve body 22, a movable part 41b relatively movable in the axial direction with respect to the fixed part 41a, and a connecting part 41d connecting the fixed part 41a to the movable part 41b. The movable part 41b is arranged on a front side of the fixed part 41a. The movable part 41b is biased forward by a compression spring 43. The compression spring 43 is a compressed spring a front end of which is locked to the movable part 41b and a rear end of which is locked to the input shaft 31 via the cylindrical member 36b and has a diameter which decreases toward the rear end thereof.

Herein, the movable part 41b is provided with the negative-pressure valve part 41b1 and an atmospheric valve part 41b2. Specifically, an outer peripheral part on a front end of the movable part 41b forms the negative-pressure valve part 41b1, and an inner peripheral part of the front end of the movable part 41b forms the atmospheric valve part 41b2. In other words, the negative-pressure valve part 41b1 and the atmospheric valve part 41b2 are formed on the front end of the movable part 41b. The negative-pressure valve part 41b1 and the atmospheric valve part 41b2 are formed of a common (one) elastic member to be integrally formed. The movable part 41b is formed of an elastic movable part 41e made of an elastic material (herein, rubber) and a metal movable part 41f made of metal and formed to have an annular plate shape fixed to a rear surface of the elastic movable part 41e. The elastic movable part 41e is integrally connected to the connecting part 41d. That is, the negative-pressure valve part 41b1 and the atmospheric valve part 41b2 are elastic members, and in this embodiment, they are rubber members. The atmospheric valve part 41b2 is described later.

The negative-pressure valve seat 22d is formed on the rear end of the cylindrical negative-pressure communication path 22b. In other words, the opening end on a rear side of the negative-pressure communication path 22b forms the negative-pressure valve seat 22d. A state in which the negative-pressure valve part 41b1 is in contact with (seated on) the negative-pressure valve seat 22d means that the negative-pressure valve V1 closes, and a state in which the negative-pressure valve part 41b1 is separated from the negative-pressure valve seat 22d means that the negative-pressure valve V1 opens. In this manner, the negative-pressure valve V1 includes the negative-pressure valve seat 22d provided on the valve body 22 and the negative-pressure valve part 41b1 relatively biased toward the negative-pressure valve seat 22d.

The negative-pressure valve part 41b1 and the negative-pressure valve seat 22d are provided with first annular contact parts 91 which come into contact with each other to block the communication between the negative-pressure chamber R1 and the variable pressure chamber R2. The first annular contact part 91 on the negative-pressure valve part 41b1 side is formed on a front end face on the outer peripheral side of the movable part 41b. The first annular contact part 91 on the negative-pressure valve seat 22d side is formed on an opening end face on a rear side of the negative-pressure communication path 22b, on an entire circumference around the opening end face. In this manner, the first annular contact part 91 is formed of an annular surface which comes into contact with the negative-pressure valve seat 22d for sealing, of the negative-pressure valve part 41b1, and an annular surface which comes into contact with the negative-pressure valve part 41b1 for sealing, of the negative-pressure valve seat 22d.

Herein, as illustrated in FIGS. 2, 3, and 5, a plurality of first protruding parts 92 protruding rearward (the negative-pressure valve part 41b1 side) are formed on a part on the outer peripheral side of the negative-pressure valve seat 22d. A plurality of first protruding parts 92 are provided on parts other than the first annular contact part 91 (radially displaced positions on the end face). Specifically, a plurality of first protruding parts 92 are arranged on an outer peripheral side of the first annular contact part 91 on the negative-pressure valve seat 22d side along an edge of the first annular contact part 91. A plurality of first protruding parts 92 are arranged at regular intervals. In addition, a plurality of first protruding parts 92 are arranged on the same circumference along the valve body 22.

Each of the first protruding parts 92 comes into contact with the negative-pressure valve part 41b1 at least in a state in which the input member 30 is in the initial position (initial state), that is, in a state in which the input member 30 is at a rearmost position. That is, in at least the initial state, the negative-pressure valve seat 22d is in contact with the negative-pressure valve part 41b1 by the first annular contact part 91 and the first protruding part 92. The initial state is the state in which the communication between the variable pressure chamber R2 and the atmospheric air is blocked (blocked state). It may be said that the initial state is a state in which an operating force is not applied to the input member 30 and is one form of the blocked state.

The first protruding part 92 comes into contact with the negative-pressure valve part 41b1 to adjust a deformation amount (or a sinking amount, a concaved amount, a collapsed amount) of the first annular contact part 91 on the side of the negative-pressure valve part 41b1 being the elastic member in the above-described initial state. In the first embodiment, in a state in which the negative-pressure valve part 41b1 is (relatively) biased toward the negative-pressure valve seat 22d, after the both come into contact with each other and the first annular contact part 91 is formed, that is, after sealing (blocking) is completely made, when the negative-pressure valve part 41b1 further sinks into the negative-pressure valve seat 22d, the first protruding part 92 comes into contact with the negative-pressure valve part 41b1. A rear end of the first protruding part 92 is located slightly in front of the first annular contact part 91 on the negative-pressure valve seat 22d side, that is, the rear end of the negative-pressure communicating path 22b. A maximum deformation amount of the first annular contact part 91 on the negative-pressure valve part 41b1 side may be adjusted by a protruding length of the first protruding part 92.

In addition, in the valve body 22, a cylindrical partition part 8 arranged coaxially with the outer peripheral surface is formed. A part of the partition part 8 forms a part on a radially inner side of the valve body 22 of the negative-pressure valve seat 22d. A plurality of first protruding parts 92 are formed on an end face of the other part of the partition part 8. A plurality of first protruding parts 92 formed on the partition part 8 are arranged at regular intervals on the same circumference. The negative-pressure valve part 41b1 is planar, and positions of the rear ends of all the first protruding parts 92 are aligned.

(Atmospheric Valve)

The atmospheric valve V2 is a valve mechanism which allows the communication between the variable pressure chamber R2 and the atmospheric air (ventilation hole 19a) and blocks the communication in accordance with forward and rearward movement of the plunger 32 with respect to the valve body 22. In other words, the atmospheric valve V2 allows the communication between the variable pressure chamber R2 and the atmospheric air (ventilation hole 19a) and blocks the communication according to relative positions of the valve body 22 and the input member 30. The atmospheric valve V2 is formed of the atmospheric valve part 41b2 and an atmospheric valve seat 32d. The atmospheric valve part 41b2 is formed on the inner peripheral side of the front end of the movable part 41b. In other words, the inner peripheral side of the front end of the movable part 41b forms the atmospheric valve part 41b2. The atmospheric valve part 41b2 is annularly formed so as to come into contact with the entire circumference in the circumferential direction of a rear end face of the plunger 32 (that is, the atmospheric valve seat 32d) at the initial position.

The atmospheric valve seat 32d is annularly formed on the rear end of the plunger 32. In other words, the rear end part (flange part) of the plunger 32 forms the atmospheric valve seat 32d. The atmospheric valve seat 32d is a member made of metal. A state in which the atmospheric valve part 41b2 is in contact with (seated on) the atmospheric valve seat 32d means that the atmospheric valve V2 closes, and a state in which the atmospheric valve part 41b2 is separated from the atmospheric valve seat 32d means that the atmospheric valve V2 opens. In this manner, the atmospheric valve V2 includes the atmospheric valve seat 32d provided on the input member 30 and the atmospheric valve part 41b2 relatively biased toward the atmospheric valve seat 32d.

The atmospheric valve part 41b2 and the atmospheric valve seat 32d are provided with second annular contact parts 93 which come into contact with each other to block the communication between the variable pressure chamber R2 and the atmospheric air. The second annular contact part 93 on the atmospheric valve part 41b2 side is formed on a front end face of the atmospheric valve part 41b2 into an annular shape swelling forward in a convex arc shape in the entire circumferential direction. In other words, the second annular contact part 93 on the atmospheric valve part 41b2 side is the annular part swelling (protruding) forward in the convex arc shape of the atmospheric valve part 41b2. The second annular contact part 93 on the atmospheric valve seat 32d side is formed on the entire circumference of the flange part of the plunger 32, and is formed into a tapered shape such that a radially outer side is located forward. In this manner, the second annular contact part 93 is formed of an annular surface which comes into contact with the atmospheric valve seat 32d for sealing, of the atmospheric valve part 41b2, and an annular surface which comes into contact with the atmospheric valve part 41b2 for sealing, of the atmospheric valve seat 32d.

Herein, as illustrated in FIGS. 2, 4, and 5, a plurality of second protruding parts 94 protruding forward (the atmospheric valve seat 32d side) are formed on a part of an inner peripheral side of the atmospheric valve part 41b2. A plurality of second protruding parts 94 are provided on parts other than the second annular contact part 93 (positions radially displaced on the end face). Specifically, a plurality of second protruding parts 94 are arranged on an inner peripheral side of the second annular contact part 93 on the atmospheric valve part 41*b*2 side along an edge of the second annular contact part 93. A plurality of second protruding parts 94 are arranged on the same circumference. Also, a plurality of second protruding parts 94 are arranged at regular intervals.

Each of the second protruding parts 94 comes into contact with the atmospheric valve seat 32*d* at least in the state in which the input member 30 is in the initial position, that is, in the state in which the input member 30 is at the rearmost position. That is, in at least the initial state, the atmospheric valve part 41*b*2 is in contact with the atmospheric valve seat 32*d* by the second annular contact part 93 and the second protruding part 94. The initial state is the state in which the communication between the variable pressure chamber R2 and the atmospheric air is blocked (blocked state). The initial state is the state in which the operating force (for example, the pedal force) is not applied to the input member 30, and may be said to be one form of the blocked state.

The second protruding part 94 comes into contact with the atmospheric valve seat 32*d* to adjust a deformation amount (or a sinking amount, a concaved amount, a collapsed amount) of the second annular contact part 93 on the side of the atmospheric valve part 41*b*2 being the elastic member in the above-described initial state. In the first embodiment, as in the first protruding part 92, in a state in which the atmospheric valve part 41*b*2 is (relatively) biased toward the atmospheric valve seat 32*d*, after the second annular contact part 93 is formed by contact of the both, that is, after sealing (blocking) is completely made, when the atmospheric valve part 41*b*2 further sinks into the atmospheric valve seat 32*d*, the second protruding part 94 comes into contact with the atmospheric valve seat 32*d*. A front end of the second protruding part 94 is located behind a front end of the second annular contact part 93 on the atmospheric valve part 41*b*2 side. A maximum deformation amount of the second annular contact part 93 on the atmospheric valve part 41*b*2 side may be adjusted by a protruding length of the second protruding part 94.

According to the first embodiment, in the initial state, the deformation amount of the negative-pressure valve part 41*b*1 is limited by the first protruding part 92, and the deformation amount of the atmospheric valve part 41*b*2 is limited by the second protruding part 94. As a result, when the negative-pressure valve V1 changes from the closed state to the opened state, a valve opening delay caused by the deformation of the negative-pressure valve part 41*b*1, that is, an ineffective stroke may be reduced. Similarly, when the atmospheric valve V2 changes from the closed state to the opened state, the valve opening delay caused by the deformation of the atmospheric valve part 41*b*2, that is, the ineffective stroke may be reduced. According to the first embodiment, the ineffective stroke illustrated in FIG. 6A may be reduced, for example. Furthermore, by reducing the ineffective stroke, hysteresis illustrated in FIG. 6B may be reduced. In FIGS. 6A and 6B, "a" indicates an intake start load.

Also, as the amount of deformation of the negative-pressure valve part 41*b*1 and the atmospheric valve part 41*b*2 in the initial state is larger, separation of the annular contact parts 91 and 93 with respect to the relative movement between the input member 30 and the valve body 22 becomes slower, and block continuing time in which the block state is continued becomes longer. However, according to the first embodiment, since the amount of deformation of the negative-pressure valve part 41*b*1 and the atmospheric valve part 41*b*2 is limited, time until the annular contact parts 91 and 93 are separated may be made shorter with respect to the relative movement between the input member 30 and the valve body 22.

Also, according to the first embodiment, by adjusting the protruding lengths (lengths in the axial direction) of the protruding parts 92 and 94 without changing elastic characteristics (rubber hardness or the like) of the valve element 41, it is possible to limit the amount of deformation to a predetermined amount. That is, according to the first embodiment, it is possible to more easily realize a configuration that permits an appropriate amount of deformation of the movable part 41*b* to ensure a sealing property and prohibits the deformation amount more than necessary.

Also, according to the first embodiment, the load applied to the first annular contact part 91 and the second annular contact part 93 by biasing is dispersed to the first protruding part 92 and the second protruding part 94 formed in parts different from the annular contact parts 91 and 93. As a result, change in the elastic characteristics of the negative-pressure valve part 41*b*1 and the atmospheric valve part 41*b*2 due to change over time is inhibited. That is, it is possible to inhibit the change over time of the ineffective stroke. In addition, it is also possible to inhibit a change in brake feeling received by a driver.

Also, the first protruding part 92 is formed on the negative-pressure valve seat 22*d* which is a resin member, and resin molding may be used in manufacturing. Therefore, manufacturing becomes easy. Also, the second protruding part 94 is formed on the atmospheric valve part 41*b*2 which is a rubber member. Therefore, as compared with forming a plurality of second protruding parts 94 on the side of the plunger 32 which is a metal member, manufacturing is easier.

In addition, since a plurality of second protruding parts 94 are arranged at regular intervals on the same circumference, it is possible to distribute the loads in a well-balanced manner, and it is possible to evenly inhibit the change of the ineffective stroke due to the change over time. In addition, with this configuration, it is possible to easily realize stable operation. The same applies to the first protruding part 92 formed in the partitioning part 8.

<Second Embodiment>

A negative-pressure type booster device of a second embodiment differs from that of the first embodiment in configurations of a first protruding part and a second protruding part. Therefore, different parts are described. The same reference sign as that in the first embodiment indicates the configuration similar to that in the first embodiment, and the preceding description is referred to.

As illustrated in FIGS. 7 and 8, a first protruding part 92A of the second embodiment is provided not on a negative-pressure valve seat 22*d* but on a negative-pressure valve part 41*b*1. That is, on an outer peripheral side of a first annular contact part 91 of the negative-pressure valve part 41*b*1, a plurality of first protruding parts 92A are formed. A plurality of first protruding parts 92A are arranged on an outer edge of a front end face of a movable part 41*b* at regular intervals on the same circumference. Each of the first protruding parts 92A is in contact with the negative-pressure valve seat 22*d* at least in an initial state. Thus, a negative-pressure valve V1 exhibits an effect similar to that of the first embodiment. Meanwhile, although the negative-pressure type booster device of the second embodiment does not have a second protruding part 94, this may also have a configuration with the second protruding part 94.

<Third Embodiment>

A negative-pressure type booster device of a third embodiment differs from that of the first embodiment in configurations of a first protruding part and a second protruding part. Therefore, different parts are described. The same reference sign as that in the first embodiment indicates the configuration similar to that in the first embodiment, and the preceding description is referred to.

As illustrated in FIGS. 9 and 10, a second protruding part 94A of the third embodiment is provided not on an atmospheric valve part 41b2 but on an atmospheric valve seat 32d. That is, on an inner peripheral side of a second annular contact part 93 of the atmospheric valve seat 32d, a plurality of second protruding parts 94A are formed. A plurality of second protruding parts 94A are arranged on a rear end face of the plunger 32 at regular intervals on the same circumference. Each of the second protruding parts 94A is in contact with the atmospheric valve part 41b2 at least in an initial state. Thus, an atmospheric valve V2 exhibits an effect similar to that of the first embodiment. Meanwhile, although the negative-pressure type booster device of the third embodiment does not include a first protruding part 92, this may also have a configuration with the first protruding part 92.

<Other Variations>

The present invention is not limited to the above-described embodiments. For example, in the first embodiment, it is possible that the negative-pressure type booster device 1 includes only one of the first protruding part 92 and the second protruding part 94. When the negative-pressure type booster device 1 includes the first protruding part 92, there is the above-described effect at least on the negative-pressure valve V1, and when the negative-pressure type booster device 1 includes the second protruding part 94, there is the above-described effect at least on the atmospheric valve V2. Also, for example, when the negative-pressure type booster device 1 includes only the second protruding part 94, it is possible to limit the amount of deformation of the second annular contact part 93 having the convex arc shape which is especially easily deformed, and an effect of reducing the ineffective stroke or the like is exerted. Also, the second embodiment and the third embodiment may be combined. Also, the present invention includes a configuration including both of the first protruding part 92 and the first protruding part 92A, and a configuration including both the second protruding part 94 and the second protruding part 94A. Also, the number of each of the first protruding parts 92 and 92A and the second protruding parts 94 and 94A may be not plural but one.

Also, the shapes of the first protruding parts 92 and 92A and the second protruding parts 94 and 94A are not limited to, for example, a dome shape (for example, a hemispherical shape) as illustrated in FIG. 9 or, for example, an arch shape as illustrated in FIGS. 3 and 4 (for example, a three-dimensional shape having a convex arc shape when viewed from the inner or outer side in the radial direction) and the like. As illustrated in FIG. 11, for example, the shape of the first protruding parts 92 and 92A and the second protruding parts 94 and 94A may be a shape formed by forming one or a plurality of slit grooves 95 (for example, a rectangular parallelepiped shape). For example, the second protruding part 94B is formed in the inner peripheral part (the part other than the second annular contact part 93) of the atmospheric valve seat 32d (the rear end face of the plunger). The atmospheric valve seat 32d is provided with the second annular contact part 93, a plurality of second protruding parts 94B, and a plurality of slit grooves 95. The slit groove 95 is a concave groove and extends in the radial direction of the valve body 22.

Also, the positions of the first protruding parts 92 and 92A may be on the inner peripheral side or the outer peripheral side of the first annular contact part 91. Also, the positions of the second protruding parts 94 and 94A may be on the inner peripheral side or the outer peripheral side of the second annular contact part 93. Meanwhile, it may be said that the negative-pressure valve part 41b1 is provided with the main body, the first annular contact part 91 provided on one end face of the main body, and one or a plurality of first protruding parts 92A protruding from the part on the outer peripheral side or the inner peripheral side of the first annular contact part 91 of one end face of the main body toward the negative-pressure valve seat 22d. Also, it may be said that the negative-pressure valve seat 22d is provided with the main body, the first annular contact part 91 provided on one end face of the main body, and one or a plurality of first protruding parts 92 protruding from the part on the outer peripheral side or the inner peripheral side of the first annular contact part 91 of one end face of the main body toward the negative-pressure valve part 41b1. Also, it may be said that the atmospheric valve part 41b2 is provided with the main body, the second annular contact part 93 provided on one end face of the main body, and one or a plurality of second protruding parts 94 protruding from the part on the outer peripheral side or the inner peripheral side of the second annular contact part 93 of one end face of the main body toward the atmospheric valve seat 32d side. Also, it may be said that the atmospheric valve seat 32d is provided with the main body, the second annular contact part 93 provided on one end face of the main body, and one or a plurality of second protruding parts 94A and 94B protruding from the part on the outer peripheral side or the inner peripheral side of the second annular contact part 93 of one end face of the main body toward the atmospheric valve part 41b2. In this embodiment, it may be said that a plurality of first protruding parts 92 and 92A or a plurality of second protruding parts 94 and 94A are arranged annularly with the protruding parts spaced apart. Furthermore, it may be said that a plurality of first protruding parts 92 and 92A or a plurality of second protruding parts 94 and 94A in this embodiment are imaginary cylinders coaxial with the valve body 22 and arranged on a side surface of one virtual cylinder or on side surfaces of a plurality of virtual cylinders having different diameters.

SUMMARY

In the negative-pressure type booster device 1 of this embodiment, the negative-pressure valve V1 includes the negative-pressure valve seat 22d provided on the valve body 22 and the negative-pressure valve part 41b1 relatively biased toward the negative-pressure valve seat 22d, the negative-pressure valve seat 22d and the negative-pressure valve part 41b1 are provided with the first annular contact parts 91 which come into contact with each other to block the communication between the negative-pressure chamber R1 and the variable pressure chamber R2, the atmospheric valve V2 includes the atmospheric valve seat 32d provided on the input member 30 and the atmospheric valve part 41b2 relatively biased toward the atmospheric valve seat 32d, and the atmospheric valve seat 32d and the atmospheric valve part 41b2 are provided with the second annular contact parts 93 which come into contact with each other to block the communication between the variable pressure chamber R2 and the atmospheric air, in which, on one of the negative-pressure valve seat 22d and the negative-pressure valve part 41b1, in the initial state in which no operating force is applied to the input member 30, one or a plurality of first protruding parts 92 which come into contact with the other of the negative-pressure valve seat 22d and the negative-pressure valve part 41b1 in the part other than the first annular contact part 91 are provided, and/or, on one of the atmospheric valve seat 32d and the atmospheric valve part 41b2, in the initial state in which no operating force is applied to the input member 30, one or a plurality of second protruding parts 94 which come into contact with the other of the atmospheric valve seat 32d and the atmospheric valve part 41b2 in the part other than the second annular contact part 93 are provided. The negative-pressure valve seat 22d or the negative-pressure valve part 41b1 may be the elastic member, and the atmospheric valve seat 32d or the atmospheric valve part 41b2 may be the elastic member.

The invention claimed is:

1. A negative-pressure type booster device comprising:
a housing including one shell arranged on one side and the other shell arranged on the other side;
a movable partition wall which partitions the interior of the housing into a negative-pressure chamber on one side and a variable pressure chamber on the other side;
a valve body assembled to the housing so as to be movable forward and rearward and connected to the movable partition wall in the housing;
an input member arranged so as to be movable forward and rearward with respect to the valve body and moving in accordance with an operating force from outside;
a negative-pressure valve that allows communication between the negative-pressure chamber and the variable pressure chamber and blocks the communication according to relative positions of the valve body and the input member; and
an atmospheric valve that allows communication between the variable pressure chamber and atmospheric air and blocks the communication according to relative positions of the valve body and the input member, the negative-pressure valve including a negative-pressure valve seat provided on the valve body and a negative-pressure valve part relatively biased toward the negative-pressure valve seat,
the negative-pressure valve seat and the negative-pressure valve part provided with first annular contact parts that come into contact with each other to block the communication between the negative-pressure chamber and the variable pressure chamber,
the atmospheric valve including an atmospheric valve seat provided on the input member and an atmospheric valve part relatively biased toward the atmospheric valve seat, and the atmospheric valve seat and the atmospheric valve part provided with second annular contact parts that come into contact with each other to block the communication between the variable pressure chamber and the atmospheric air,
wherein, on one of the negative-pressure valve seat and the negative-pressure valve part, one or a plurality of first protruding parts that come into contact with the other of the negative-pressure valve seat and the negative-pressure valve part in a part other than the first annular contact parts in an initial state in which no operating force is applied to the input member are provided,
and/or,
on one of the atmospheric valve seat and the atmospheric valve part, one or a plurality of second protruding parts that come into contact with the other of the atmospheric valve seat and the atmospheric valve part in a part other than the second annular contact parts in the initial state in which no operating force is applied to the input member are provided.

2. The negative-pressure type booster device according to claim 1, wherein the atmospheric valve part is an elastic member, and the second protruding part is provided on the atmospheric valve part.

3. The negative-pressure type booster device according to claim 2, wherein the plurality of second protruding parts are arranged at regular intervals on the same circumference.

4. The negative-pressure type booster device according to claim 2, wherein the negative-pressure valve seat is a resin member, and the first protruding part is provided on the negative-pressure valve seat.

5. The negative-pressure type booster device according to claim 1, wherein the plurality of second protruding parts are arranged at regular intervals on the same circumference.

6. The negative-pressure type booster device according to claim 5, wherein the negative-pressure valve seat is a resin member, and the first protruding part is provided on the negative-pressure valve seat.

7. The negative-pressure type booster device according to claim 1, wherein the negative-pressure valve seat is a resin member, and the first protruding part is provided on the negative-pressure valve seat.

* * * * *